(12) United States Patent
Yoo et al.

(10) Patent No.: US 9,672,642 B2
(45) Date of Patent: Jun. 6, 2017

(54) APPARATUS AND METHOD OF PERFORMING TILE BINNING OF BEZIER CURVE

(71) Applicant: SAMSUNG ELECTRONICS CO., LTD., Suwon (KR)

(72) Inventors: Jeong Joon Yoo, Hwaseong (KR); Seok Yoon Jung, Seoul (KR); Seung Won Lee, Hwaseong (KR); Shi Hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 13/940,780

(22) Filed: Jul. 12, 2013

(65) Prior Publication Data

US 2014/0015838 A1    Jan. 16, 2014

(30) Foreign Application Priority Data

Jul. 12, 2012    (KR) .......................... 10-2012-0075877

(51) Int. Cl.
*G06T 11/20*    (2006.01)
(52) U.S. Cl.
CPC ............ *G06T 11/203* (2013.01); *G06T 11/20* (2013.01); *G09G 2360/122* (2013.01)
(58) Field of Classification Search
CPC .. G06T 11/20; G06T 11/203; G09G 2360/122
See application file for complete search history.

(56) References Cited

U.S. PATENT DOCUMENTS

| 6,295,072 | B1 | 9/2001 | Pon et al. |
| 6,784,884 | B1* | 8/2004 | Hsieh ............... G06T 15/005 345/421 |
| 2007/0097123 | A1 | 5/2007 | Loop et al. |
| 2009/0141038 | A1 | 6/2009 | Newaskar et al. |
| 2010/0289802 | A1 | 11/2010 | Falchetto |
| 2011/0025693 | A1 | 2/2011 | Merry |
| 2011/0248997 | A1* | 10/2011 | Munkberg .......... G06T 17/20 345/423 |
| 2011/0261059 | A1* | 10/2011 | Keall ................. G06T 11/40 345/442 |
| 2012/0229464 | A1* | 9/2012 | Fishwick ............ G06T 17/20 345/423 |

FOREIGN PATENT DOCUMENTS

| JP | 2009-86842 | 4/2009 |
| KR | 1997-0071229 | 11/1997 |
| KR | 10-2004-0027852 | 4/2004 |
| KR | 10-2006-0041784 | 5/2006 |
| KR | 10-2011-0111259 | 10/2011 |

\* cited by examiner

*Primary Examiner* — Michelle L Sams
(74) *Attorney, Agent, or Firm* — Sughrue Mion, PLLC

(57) ABSTRACT

An apparatus and method for tile binning with respect to a Bezier curve. The apparatus may include a curve identification unit to identify a Bezier curve included in input data, a bounding box generation unit to generate a plurality of bounding boxes corresponding to the Bezier curve, and a tile binning unit to perform tile binning with respect to the Bezier curve based on the plurality of bounding boxes.

19 Claims, 14 Drawing Sheets

APPARATUS AND METHOD OF PERFORMING TILE BINNING OF BEZIER CURVE

CROSS-REFERENCE TO RELATED APPLICATIONS

This application claims the priority benefit of Korean Patent Application No. 10-2012-0075877, filed on Jul. 12, 2012, in the Korean Intellectual Property Office, the disclosure of which is incorporated herein by reference.

BACKGROUND

1. Field

Example embodiments of the following disclosure relate to a technology for efficiently performing tile binning by generating and using at least one bounding box which is tight with respect to a Bezier curve for graphic processing.

2. Description of the Related Art

Since three-dimensional (3D) graphic data has a large data size, a method to minimize a memory bandwidth is demanded.

In an embedded system, for example, a product for mobile devices, such a method to reduce the memory bandwidth is necessary. For example, Imagination Co., Ltd. uses tile based rendering (TBR) as a method for processing 3D graphics in a product for mobile devices.

The TBR refers to a rendering method that divides a screen into a plurality of tiles and displays the picture in units of the tile. Since the TBR loads only 3D graphic data included in the tiles on a high-performance on-chip memory and processes the loaded data, access to an external memory is reduced. Accordingly, a necessary bandwidth of the external memory may be reduced.

Generally, when access to an internal memory is performed instead of access to an external memory, power consumption may be almost ten times reduced, accordingly increasing life of a battery.

To draw curves included in tiles, figures belonging to a current tile need to be inspected in advance, which is called tile binning. For the tile binning, bounding boxes surrounding respective figures are generated, and information on tiles overlapping the bounding boxes is inspected. The information may be stored in a data structure, so called a tile bin or tile binner.

SUMMARY

The foregoing and/or other aspects are achieved by providing a graphic processing apparatus for correcting an image, including a curve identification unit to identify a Bezier curve included in input data; a bounding box generation unit to generate a plurality of bounding boxes corresponding to the Bezier curve; and a tile binning unit to perform tile binning with respect to the Bezier curve based on the plurality of bounding boxes.

The bounding box generation unit may determine a plurality of control points on the Bezier curve and generate the plurality of bounding boxes using the plurality of control points.

The bounding box generation unit may determine a first control point, a second control point, and a third control point on the Bezier curve.

The bounding box generation unit may generate the plurality of bounding boxes by setting at least one of the first control point, the second control point, and the third control point as vertices.

The bounding box generation unit may determine the second control point having a local maximum of the Bezier curve, and determine the first control point or the third control point having a global minimum of the Bezier curve.

The bounding box generation unit may determine the second control point having a local minimum of the Bezier curve, and determine the first control point or the third control point having a global maximum of the Bezier curve.

The bounding box generation unit may generate a first bounding box by setting the first control point and the second control point as vertices, and generate a second bounding box by setting the second control point and the third control point as vertices.

The tile binning unit may determine whether at least a part of an area defined by the plurality of bounding boxes is included in a tile and accordingly performs tile binning with respect to the Bezier curve.

The foregoing and/or other aspects are also achieved by providing a graphic processing apparatus including a curve identification unit to identify a Bezier curve included in input data; a bounding box generation unit to confirm a type of the Bezier curve and generate a bounding box reflecting the type of the Bezier curve; and a tile binning unit to perform tile binning with respect to the Bezier curve based on the bounding box.

The bounding box generation unit may determine whether the Bezier curve has a stroked curve form or a filled curve form, and generate a plurality of bounding boxes corresponding to the Bezier curve when the Bezier curve has the stroked curve form.

The bounding box generation unit may generate a tight bounding box that is tight against the Bezier curve when the Bezier curve has the filled curve form.

The tile binning unit may determine whether at least a part of an area defined by the plurality of bounding boxes is included in a tile and accordingly perform tile binning with respect to the Bezier curve.

The foregoing and/or other aspects are also achieved by providing a graphic processing method of a graphic processing apparatus, including identifying a Bezier curve included in input data; determining a plurality of control points on the Bezier curve; generating a plurality of bounding boxes using the determined plurality of control points; and performing tile binning with respect to the Bezier curve based on the plurality of bounding boxes.

The generating of the plurality of bounding boxes may include determining a first control point, a second control point, and a third control point on the Bezier curve; generating a first bounding box using the first control point and the second control point as vertices; and generating a second bounding box using the second control point and the third control point as vertices.

The performing may include performing tile binning with respect to the Bezier curve by determining whether at least a part of an area defined by the first bounding box and the second bounding box is included in a tile.

The foregoing and/or other aspects are also achieved by providing a graphic processing method, including: identifying a Bezier curve; and performing tile binning by generating and using at least one bounding box that is tight with respect to the identified Bezier curve.

The generating of the at least one bounding box that may be tight with respect to the identified Bezier curve and may be based on a type of the Bezier curve.

One bounding box may be generated when the type of the Bezier curve is a filled curve form.

A plurality of bounding boxes may be generated when the type of the Bezier curve is a stroked curve form.

The at least one bounding box may be generated using control points passing through the Bezier curve.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to exemplary embodiments of the present invention, examples of which are illustrated in the accompanying drawings.

In the description of the present invention, if detailed descriptions of related disclosed art or configuration are determined to unnecessarily make the subject matter of the present invention obscure, they will be omitted. Terms to be used below are defined based on their functions in the present invention and may vary according to users, user's intentions, or practices. Therefore, the definitions of the terms should be determined based on the entire specification.

Figure 1:
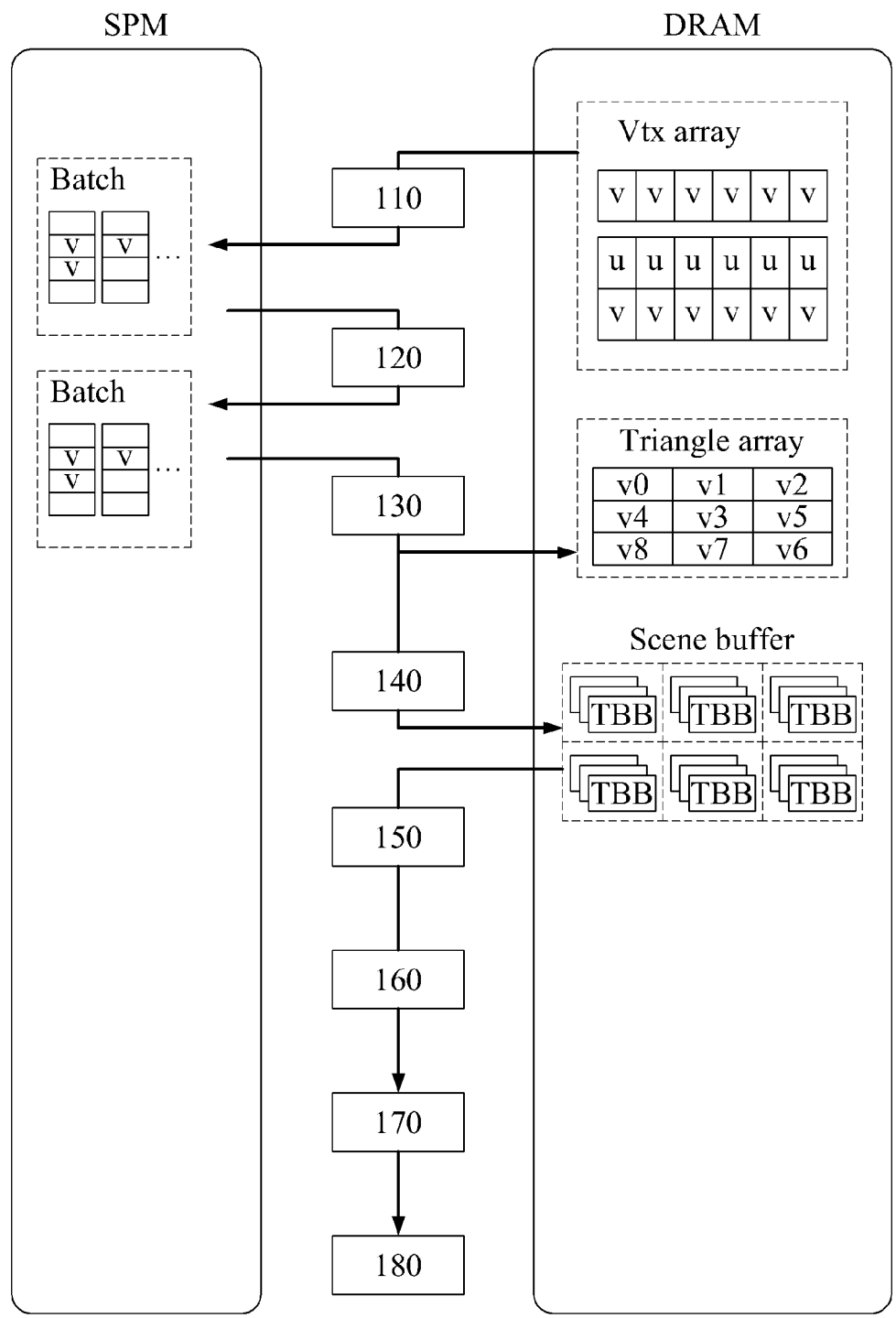
FIG. 1 illustrates a tile-based rendering (TBR) pipeline, according to example embodiments.

FIG. 1 illustrates a tile-based rendering (TBR) pipeline 100, according to example embodiments.

A batch management unit (BMU) 110, according to the example embodiments, may be input with three-dimensional (3D) graphic data, that is, a Vtx array as in FIG. 1. Further, the BMU 110 may group the 3D graphic data in units of batches.

A vertex shader unit (VS) 120, according to the example embodiments, may load one batch of grouped 3D graphic data, and convert the batch into a coordinate on a screen with respect to one piece of vertex data.

A primitive assembler unit (PA) 130 according to the example embodiments may produce triangles by connecting points.

A tile binner unit (TB) 140 according to the example embodiments may perform tile binning with respect to each of the triangles.

In addition, the TB 140 may perform tile binning also with respect to a Bezier curve.

For this function, the TB 140 may identify a Bezier curve from input data and perform tile binning in different manners according to whether the Bezier curve is a stroked curve or a filled curve.

When the Bezier curve is identified as the stroked curve, the TB 140 may generate a plurality of bounding boxes corresponding to the stroked curve.

In addition, the TB 140 may perform tile binning with respect to the Bezier curve using the plurality of bounding boxes.

When the Bezier curve is identified as the filled curve, the TB 140 may generate a tight bounding box for the filled curve. That is, the TB 140 may generate one bounding box which is tight with respect to a Bezier curve.

Accordingly, the TB 140 may perform tile binning using the plurality of bounding boxes or the tight bounding box.

A tile refers to a unit piece of a screen of a terminal. Tile binning refers to a process of inspecting which tile on the screen overlaps a triangle and a Bezier curve, and converting corresponding information into a data structure.

A tile dispatching unit (TDU) 150, according to the example embodiments, may divide the screen into tiles for divisional processing when a plurality of graphic processing units are included.

A fragment generator unit (FG) 160, according to the example embodiments, may perform rendering with respect to the triangle or the Bezier curve present in each tile by referencing the data structure generated by tile binning.

For example, the FG 160 may determine a color, a depth, and the like of a pixel, however, the present disclosure is not limited thereto.

A pixel shader unit (PS) 170, according to the example embodiments, may determine a final color reflecting a color of a current pixel, by referencing a color sampled from a texture and an alpha value indicating transparency.

A raster operation unit (ROP) 180 according to the example embodiments may perform depth test, alpha test, and the like, thereby determining whether 3D Graphics Data is shown in a final screen. Through the foregoing process, the 3D graphic data is rendered on the screen.

The above units 110-180 are exemplary and are not limited to the above discussed order. Further, the above units 110-180 may be selectively included.

Figure 2:
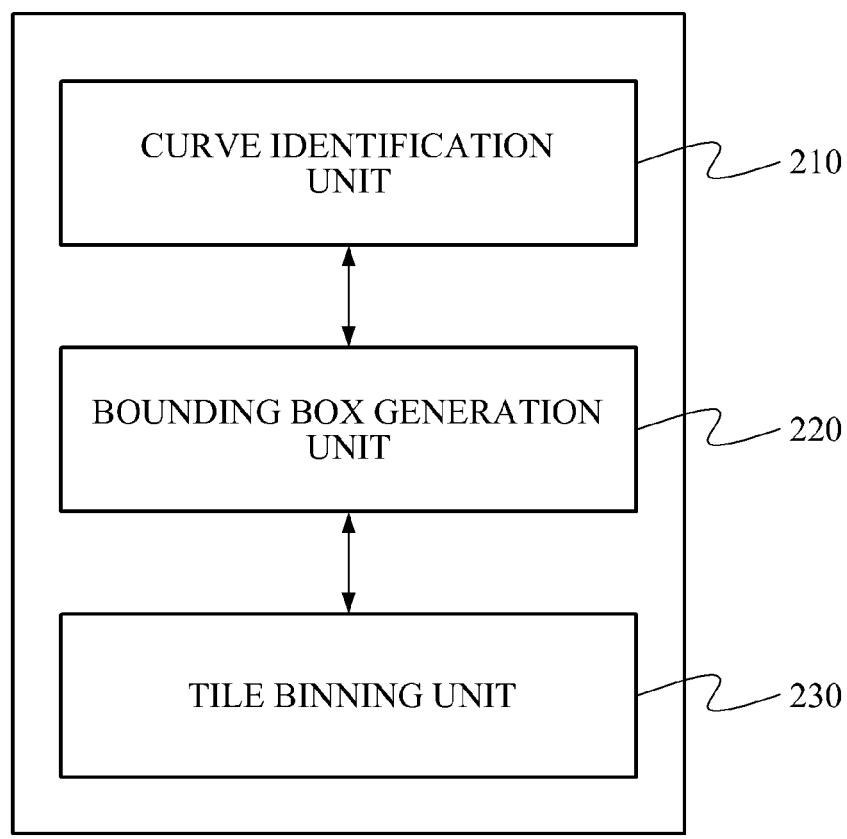
FIG. 2 illustrates graphic processing apparatus, according to example embodiments.

FIG. 2 illustrates a graphic processing apparatus 200, according to example embodiments.

The graphic processing apparatus 200 may be an apparatus performing tile binning with respect to a Bezier curve, as one of the functions discussed above with respect to the TB 140 of FIG. 1.

That is, the graphic processing apparatus 200 may identify the Bezier curve from input data and determine tiles to display the identified Bezier curve more accurately. In addition, the graphic processing apparatus 200 may perform tile binning using the determined tiles.

In detail, to achieve the above functions, for example, the graphic processing apparatus 200 may include a curve identification unit 210, a bounding box generation unit 220, and a tile binning unit 230. Each of the curve identification unit 210, the bounding box generation unit 220, and the tile binning unit 230 may include at least one processing device.

The curve identification unit 210 may identify the Bezier curve included in the input data.

According to a definition of the Bezier curve, a quadratic Bezier curve includes three control points while a cubic control point includes four control points.

In describing the example embodiments, for a convenient explanation, a quadratic Bezier curve including three control points and a bounding box generated based on the quadratic Bezier curve will be described. However, the example embodiments of the present disclosure are not limited to the quadratic Bezier curve. Also, in the case of the cubic Bezier curve, at least one bounding box may be applied.

The bounding box generation unit 220 may generate a plurality of bounding boxes corresponding to the identified Bezier curve.

The bounding box generation unit 220 may determine a plurality of control points on the Bezier curve, and generate the plurality of bounding boxes using the plurality of control points.

For example, the bounding box generation unit 220 may determine a first control point, a second control point, and a third control point on the Bezier curve.

Depending on the definition of the quadratic Bezier curve, the quadratic Bezier curve may be rendered within a rectangular region including the control points, that is, within a bounding box.

The tile binning unit 230 may perform tile binning with respect to the Bezier curve based on the plurality of bounding boxes.

The tile binning unit 230 may determine whether at least a part of an area defined by the plurality of bounding boxes is included in a tile, and accordingly perform tile binning with respect to the Bezier curve.

The Bezier curve and the plurality of bounding boxes generated by the Bezier curve will be described in further detail with reference to FIGS. 3 and 4.

Figure 3:
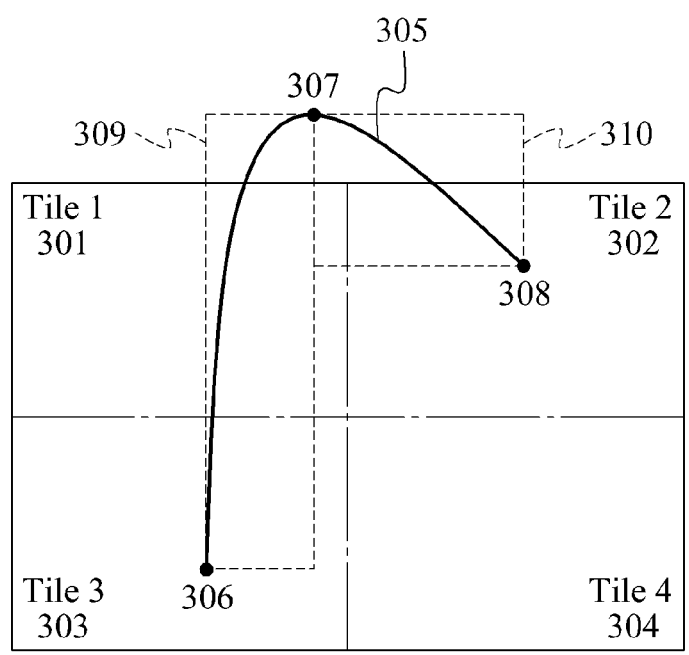
FIGS. 3 and 4 illustrate a plurality of bounding boxes generated with respect to a Bezier curve in a stroked curve form, according to example embodiments.
Figure 4:
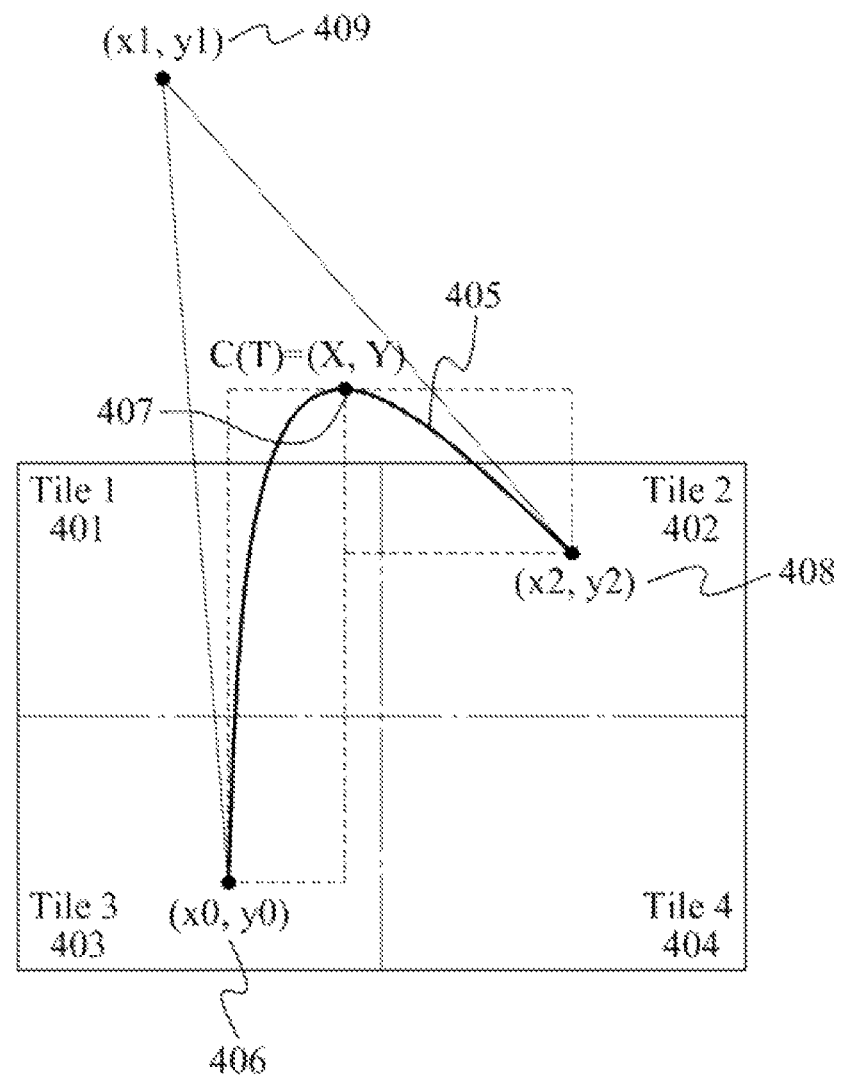

FIGS. 3 and 4 illustrate a plurality of bounding boxes generated with respect to a Bezier curve in the form of a stroked curve, for example.

The Bezier curve of the stroked curve form may refer to a curve rendered with respect to the Bezier curve, irrespective of an area defined by the Bezier curve.

Conversely, the Bezier curve in the form of a filled curve may refer to a curve rendered in consideration of not only the Bezier curve, but also an area defined by the Bezier curve.

Referring to FIG. 3, one screen may include a tile 1 (301), a tile 2 (302), a tile 3 (303), and a tile 4 (304).

As shown in FIG. 3, a Bezier curve 305 according to example embodiments may be displayed only in the tile 1 (301), the tile 2 (302), and the tile 3 (303). The Bezier curve 305 may include a first control point 306, a second control point 307, and a third control point 308.

Referring to FIG. 3, the first control point 306 may be understood as a global minimum of the Bezier curve 305 while the second control point 307 may be understood as a local maximum of the Bezier curve 305, however, the present disclosure is not limited thereto.

Therefore, the bounding box generation unit 220 may generate two tight bounding boxes as the plurality of bounding boxes.

The bounding box generation unit 220 may generate a first bounding box 309 passing through the first control point 306 and the second control point 307, and a second bounding box 310 passing through the second control point 307 and the third control point 308.

That is, the bounding box generation unit 220 may generate the plurality of bounding boxes using the first control point 306, the second control point 307, and the third control point 308.

Generally, a stroked curve is opened at one side, different from a triangle.

Referring to FIG. 4, a stroked curve 405 may be displayed in a tile 1 (401), a tile 2 (402), and a tile 3 (403).

As shown in FIG. 4, the plurality of bounding boxes may include two bounding boxes facing each other or adjacent to each other with respect to a local maximum C(T) of a stroked curve 405.

Thus, when tile binning is performed using the two bounding boxes, overlap between an area generated by the bounding boxes and a tile 4 (404) may be avoided when compared to a general method.

Since the area generated by the bounding boxes does not overlap the tile 4 (404), a memory necessary for a tile bin structure of the tile 4 (404) may be reduced. In addition, since rendering of the stroked curve 405 in the tile 4 (404) is omitted, computing cost for the rendering may be reduced and efficiency may be increased.

According to whether the Bezier curve is the stroked curve or the filled curve, a method of generating the bounding box may be determined.

The method of when the Bezier curve is the stroked curve will be described first. Next, a method of calculating a bounding box when the Bezier curve is the filled curve will be described.

A bounding box generation unit, for example, the bounding box generation unit 220 of FIG. 2, according to example embodiments, may generate a first bounding box passing through a first control point 406 and a local maximum 407 C(T), and a second bounding box passing through the local maximum 407 C(T) and a second control point 408. An additional control point 409 with coordinates (x1, y1) may be provided.

The first bounding box may be a box including the first control point 406 which is a starting control point and the local maximum 407 C(T) as two facing vertices, that is, two vertices that are diagonal from each other as shown in FIG. 4. The second bounding box may be a box including the second control point 408 which is an ending control point and the local maximum 407 C(T) as two facing vertices, that is, two vertices that are diagonal from each other.

The first control point 406, which is the starting control point, and the second control point 408, which is the ending control point, are provided as control points for generation of a curve. An additional control point 409 with coordinates (x1, y1) may be provided. The local maximum 407 C(T) may be calculated as illustrated in FIG. 5.

To calculate the local maximum 407 C(T) of the Bezier curve, characteristics of the Bezier curve illustrated with reference to FIG. 5 may be used.

Figure 5:
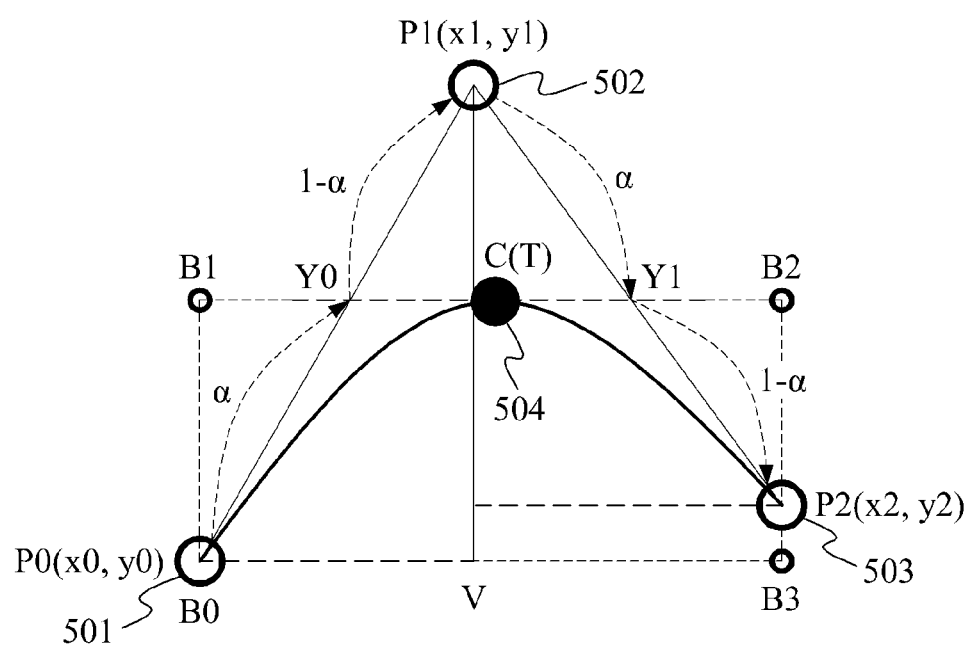
FIG. 5 illustrates proportional analysis of length of a line segment using characteristics of a Bezier curve, according to example embodiments.

FIG. 5 illustrates proportional analysis of the length of a line segment using characteristics of a Bezier curve, according to example embodiments.

Referring to FIG. 5, expressions of Expression 1 may be deduced based on the characteristics of the Bezier curve.

$$\alpha : 1-\alpha = (Y0-y0) : y1-Y0$$

$$\alpha : 1-\alpha = (y1-Y1) : Y1-y2 \qquad \text{[Expression 1]}$$

In Expression 1, a denotes time required for moving from a position P0 501 to a position Y0 or time required for moving from a position P1 502 to a position Y1. 1−α denotes time required for moving from the position Y0 to the position P1 502 or time required for moving from the position Y1 to a position P2 503.

Y0−y0 may be understood as a Y coordinate value of the local maximum 504 C(T). y1−Y0 may be understood as a Y coordinate value of the position P1.

A relational expression of Expression 1 may be rearranged using Y0 into Expression 2.

$$(1-\alpha)(Y0-y0)=\alpha(y1-Y0)$$

$$(Y0-y0)-\alpha(Y0-y0)=\alpha(y1-Y0)$$

$$Y0-\alpha Y0=\alpha(y1-Y0)+y0-\alpha y0$$

$$Y0=y0-\alpha y0+\alpha y1 \quad \text{[Expression 2]}$$

In Expression 2, a denotes time required for moving from the position P0 501 to the Position Y0 or time required for moving from the position P1 502 to the position Y1. 1−α denotes time required for moving from the position Y0 to the position P1 502 or time required for moving from the position Y1 to the position P2 503. Y0−y0 may be understood as a Y coordinate value of a local maximum 504 C(T). y1−Y0 may be understood as the Y coordinate value of the position P1.

Expression 2 of Expression 1 may be rearranged using Y1 into Expression 3.

$$\alpha:1-\alpha=(y1-Y1):Y1-y2$$

$$\alpha(Y1-y2)=(1-\alpha)(y1-Y1)$$

$$\alpha Y1-\alpha y2+(1-\alpha)Y1=(1-\alpha)y1$$

$$Y1=y1-\alpha y1+\alpha y2 \quad \text{[Expression 4]}$$

In Expression 3, a denotes time required for moving from the position P0 501 to the position Y0 or time required for moving from the position P1 502 to the position Y1. 1−α denotes time required for moving from the position Y0 to the position P1 502 or time required for moving from the position Y1 to the position P2 503. Y0−y0 may be understood as the Y coordinate value of the local maximum 504 C(T). y1−Y0 may be understood as the Y coordinate value of the position P1.

Since a gradient of a local maximum in the Bezier curve is 0, Y0 and Y1 are equal.

Therefore, Y0 of Expression 2 and Y1 of Expression 3 are equal, as expressed by Expression 4.

$$y0-\alpha y0+\alpha y1=y1-\alpha y1+ay2 \quad \text{[Expression 4]}$$

In Expression 4, a denotes time required for moving from the position P0 501 to the position Y0.

Expression 4 may be rearranged with respect to α into Expression 5.

$$\alpha=(y0-y1)/(y0-2y1+y2) \quad \text{[Expression 5]}$$

In Expression 5, a denotes time required for moving from the position P0 501 to the position Y0.

When the α is substituted into Expression 2 to obtain Y0 and into Expression 3 to obtain Y1, then an equation C(t) related to a quadratic Bezier curve may be expressed by Expression 6.

$$C(t)=(1-t)^2 P0+2(1-t)tP1+t^2 P2, \; t\in[0,1]$$

$$X(t)=(1-t)^2 x0+2(1-t)tx1+t^2 x2$$

$$Y(t)=(1-t)^2 y0+2(1-t)ty1+t^2 y2 \quad \text{[Expression 6]}$$

A coordinate of the local maximum of the Bezier curve is (X, Y). Since a value t may be calculated using a of Expression 5, an X coordinate of the local maximum may be calculated using X(t) of Expression 6.

Therefore, an equation with respect to the Bezier curve at the local maximum may be deduced as shown in Expression 7.

When C(t)=(X,Y), $$t=(y0-y1)/(y0-2y1+y2)$$

$$Y=(y1-y0)(y0-y1)/(y0-2y1+y2)+y0$$

$$X=(1-t)^2 x0+2(1-t)tx1+t^2 x2 \quad \text{[Expression 7]}$$

Using a method of Expression 7 to calculate a coordinate related to C(t)=(X, Y), a coordinate of a bounding box including (x0, y0) and C(t) as facing coordinates and another bounding box including (x2, y2) and C(t) as facing coordinates may be deduced.

Next, a method of calculating a bounding box when the Bezier curve is the filled curve will be described.

Figure 6:
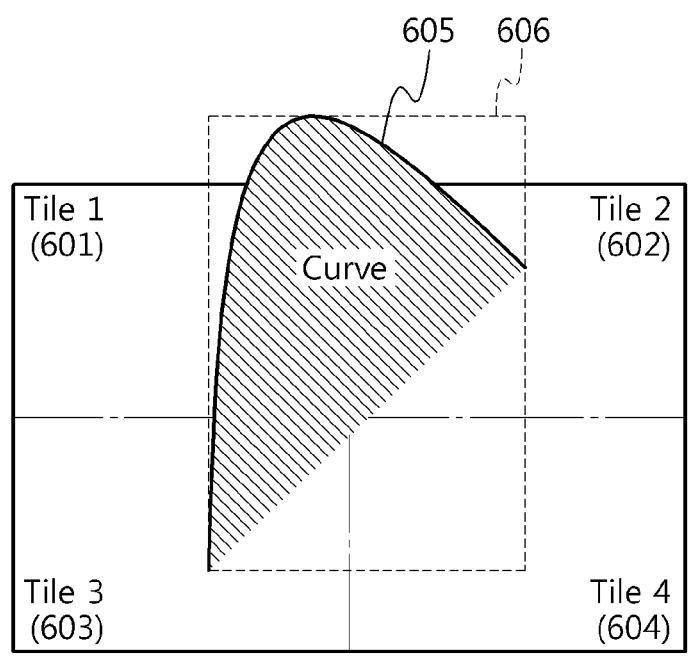
FIGS. 6 and 7 illustrate a bounding box generated with respect to a Bezier curve in a filled curve form, according to example embodiments.
Figure 7:
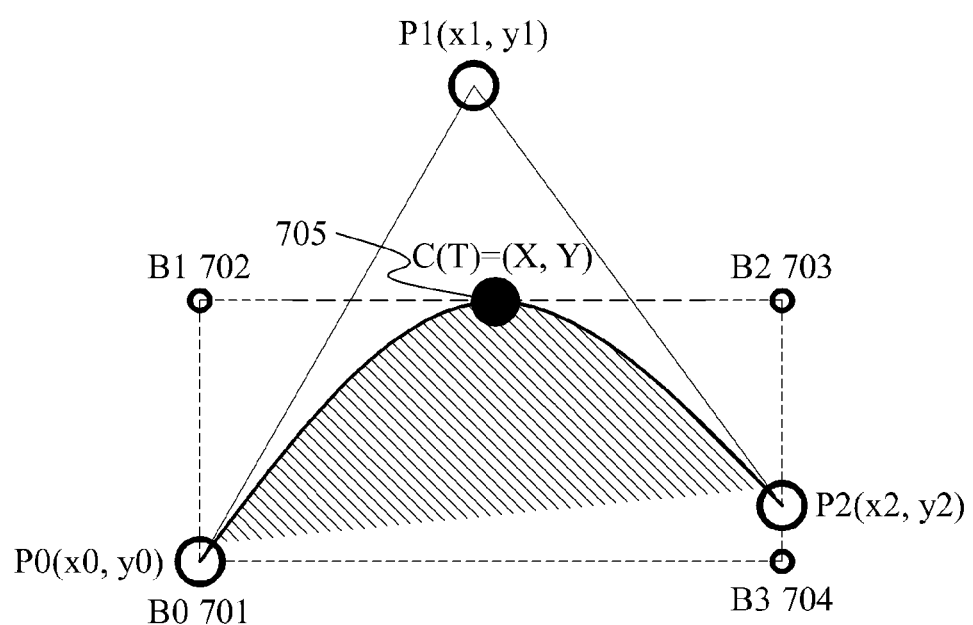

FIGS. 6 and 7 illustrate a bounding box generated with respect to a Bezier curve 605 in a filled curve form, according to example embodiments.

As shown in FIG. 6, when the Bezier curve 605 has the filled curve form, an area is also taken into consideration. That is, the Bezier curve 605 may be displayed in a tile 1 (601), a tile 2 (602), and a tile 3 (603). However, an area of a curve formed by the Bezier curve 605 is displayed in a tile 4 (604).

Therefore, with respect to the Bezier curve 605 of which the area needs to be considered, tile binning may be performed by generating one bounding box 606 which is tight with respect to the Bezier curve 605.

Here, the bounding box 606 may be generated by three control points passing through the Bezier curve 605.

As a result, a graphic processing apparatus, for example, the graphic processing apparatus 200 of FIG. 2, according to example embodiments, may perform tile binning by generating a plurality of bounding boxes or generating one tight bounding box, by a bounding box generation unit, for example, bounding box generation unit 220 of FIG. 2.

For this, the graphic processing apparatus may identify a Bezier curve from input data and determine whether to generate the plurality of bounding boxes or one tight bounding box.

In detail, the graphic processing apparatus may include a curve identification unit to identify a Bezier curve included in the input data, a bounding box generation unit to determine a type of the Bezier curve and generate a bounding box corresponding to the type of the Bezier curve, and a tile binning unit to perform tile binning with respect to the Bezier curve based on the bounding box.

First, the bounding box generation unit may determine whether the Bezier curve has a stroke curve form or a filled curve form.

Therefore, when the Bezier curve has the stroked curve form, the bounding box generation unit may generate a plurality of bounding boxes corresponding to the Bezier curve.

In addition, the tile binning unit may determine whether at least a part of an area defined by the plurality of bounding boxes is included in a tile defined by the plurality of bounding boxes and accordingly perform tile binning with respect to the Bezier curve.

For example, the Bezier curve shown in FIG. 7 has the filled curve form. As such, the bounding box generation unit may generate coordinates of a position B0 701, a position B1 702, a position B2 703, and a position B3 704 of a bounding box which is tight against the Bezier curve using a coordinate of the local maximum 705 C(T) generated, according to Expression 7.

The coordinates of the position B0 701, the position B1 702, the position B2 703, and the position B3 704 may be defined by Expression 8.

$B0=(\min(x0,x2,X),\min(y0,y2,Y));$ $B1=(\min(x0,x2,X),\max(y0,y2,Y));$ $B2=(\max(x0,x2,X),\max(y0,y2,Y));$ $B3=(\max(x0,x2,X),\min(y0,y2,Y));$ [Expression 8]

That is, the bounding box generation unit may determine the coordinate of the position B0 701, using a smallest X coordinate and a smallest Y coordinate among a coordinate P0 (x0, y0) of a first control point, a coordinate (X, Y) of a local maximum or local minimum, and a coordinate P2 (x2, y2) of a second control point.

The bounding box generation unit may determine the coordinate of the position B1 702, using a smallest X coordinate and a largest Y coordinate among the coordinate P0 (x0, y0) of the first control point, the coordinate (X, Y) of the local maximum or local minimum, and the coordinate P2 (x2, y2) of the second control point.

The bounding box generation unit may determine the coordinate of the position B2 703, using a largest X coordinate and a largest Y coordinate among the coordinate P0 (x0, y0) of the first control point, the coordinate (X, Y) of the local maximum or local minimum, and the coordinate P2 (x2, y2) of the second control point.

In addition, the bounding box generation unit may determine the coordinate of the position B3 704, using a largest X coordinate and a smallest Y coordinate among the coordinate P0 (x0, y0) of the first control point, the coordinate (X, Y) of the local maximum or local minimum, and the coordinate P2 (x2, y2) of the second control point.

The positions B0 701, B1 702, B2 703, and B3 704 determined as aforementioned may be understood as coordinates of four vertices of the tight bounding box.

For example, to obtain the area of the bounding box, the positions B0 701, B1 702, B2 703, and B3 704 do not all have to be calculated. That is, the bounding box may be generated by calculating only the positions B0 701 and B2 703 facing each other or only the positions B1 702 and B3 704 facing each other.

Figure 8:
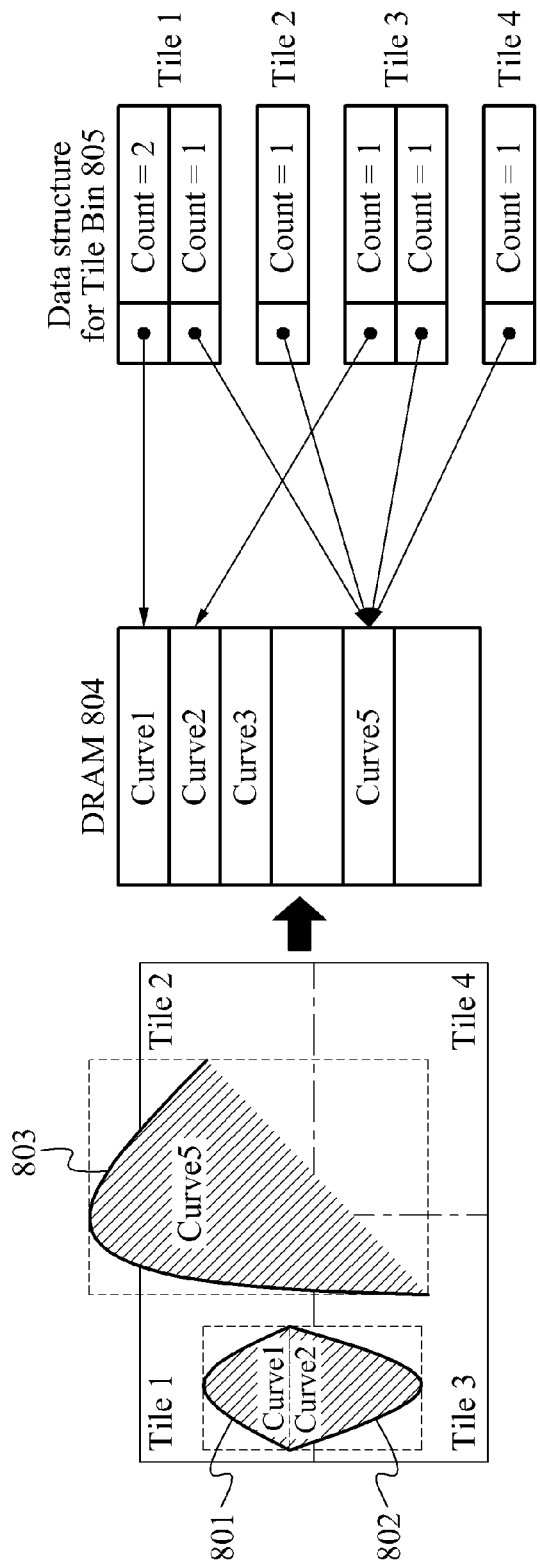
FIG. 8 illustrates an example of tile binning performed with respect to a Bezier curve in a filled curve form, according to example embodiments.

FIG. 8 illustrates an example of tile binning performed with respect to a Bezier curve in a filled curve form, according to example embodiments As shown in FIG. 8, a screen is divided into a tile 1 to a tile 4. At least a portion of a curve 1 (801), a curve 2 (802), and a curve 5 (803) are displayed in the tile 1.

Only the curve 5 (803) is displayed in the tile 2. The curve 2 (802) and the curve 5 (803) are displayed in the tile 3. The curve 5 (803) is in the filled curve form and displayed in the tile 4.

Therefore, display of the respective curves recorded in a dynamic random access memory (DRAM) 804 may be controlled by a data structure 805 for tile binning.

For example, the data structure 805 for tile binning may control the curve 1 (801) to a next curve, that is, the curve 2 (802), to be displayed in the tile 1, and control the curve 5 (803) to be further displayed in the tile 1. For example, tile 1 may display curves from the curve (801) to the next curve (802) by data structure 805.

Thus, the data structure 805 for tile binning may control display of the tiles with respect to the respective curves recorded in the DRAM 804.

At last, the data structure 805 for tile binning may control the curve 5 (803) to be displayed in the tile 4.

Figure 9:
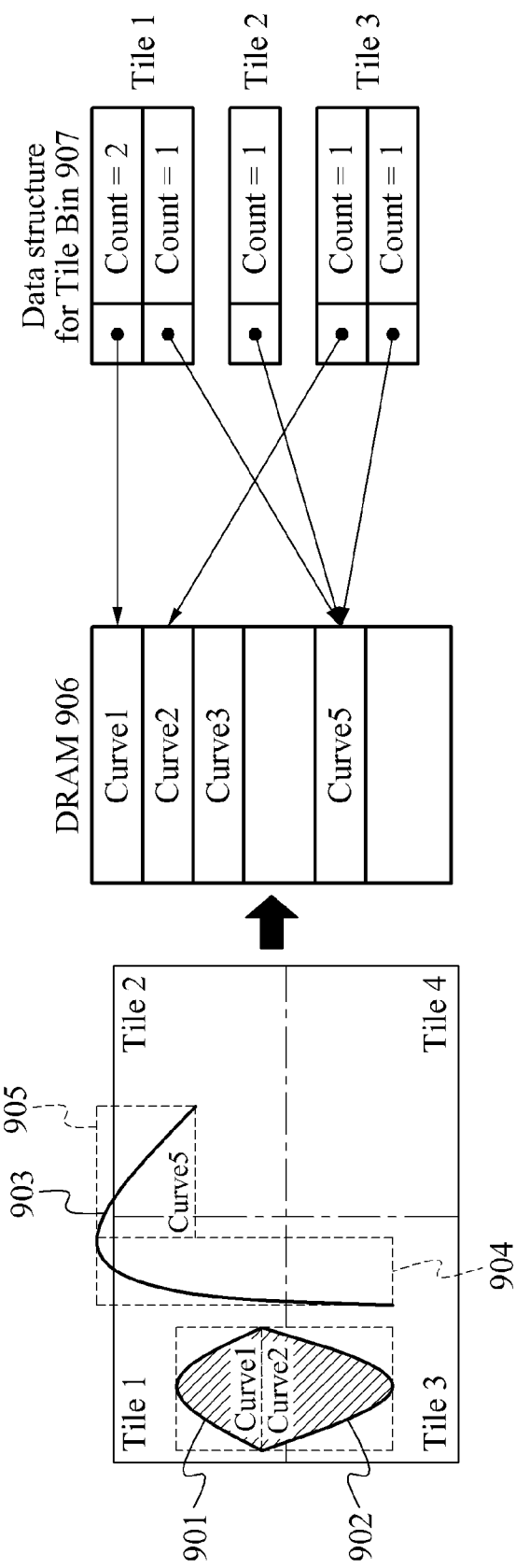
FIG. 9 illustrates an example of tile binning performed with respect to a Bezier curve in a stroked curve form, according to example embodiments.

FIG. 9 illustrates an example of tile binning performed with respect to a Bezier curve in a stroked curve form, according to example embodiments.

As shown in FIG. 9, a screen may be divided into a tile 1 to a tile 4. A curve 1 (901), a curve 2 (902), and a curve 5 (903) are displayed in the tile 1.

Only the curve 5 (903) may be displayed in the tile 2. The curve 2 (902) and the curve 5 (903) may be displayed in the tile 3. The curve 5 (903) being in the stroked curve form may not be displayed in the tile 4.

That is, the graphic processing apparatus, according to the example embodiments, may determine that an area defined by a first bounding box 904 and a second bounding box 905 generated from the curve 5 (903) does not overlap the tile 4, and therefore does not display the curve 5 (903) in the tile 4.

Accordingly, display of the respective curves recorded in a DRAM 906 may be controlled by a data structure 907 for tile binning.

The data structure 907 for tile binning may control the curve 1 (901) to a next curve, that is, the curve 2 (902), to be displayed in the tile 1 and control the curve 5 (903) to be further displayed in the tile 1. For example, tile 1 may display curves from the curve (901) to the next curve (902) by data structure 907.

The data structure 907 for tile binning may control display of the tiles with respect to the respective curves recorded in the DRAM 906.

At last, the data structure 907 for tile binning may control the curve 5 (903) to be not displayed in the tile 4.

Figure 10:
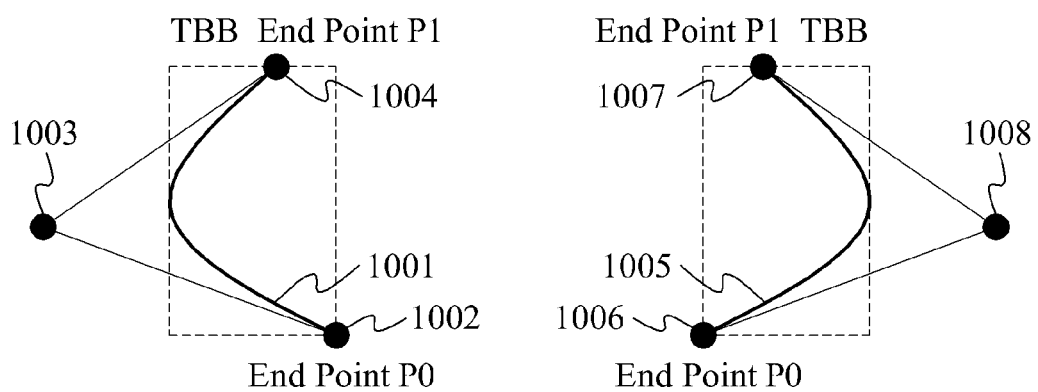
FIGS. 10 and 11 illustrate various types of Bezier curve.
Figure 11:
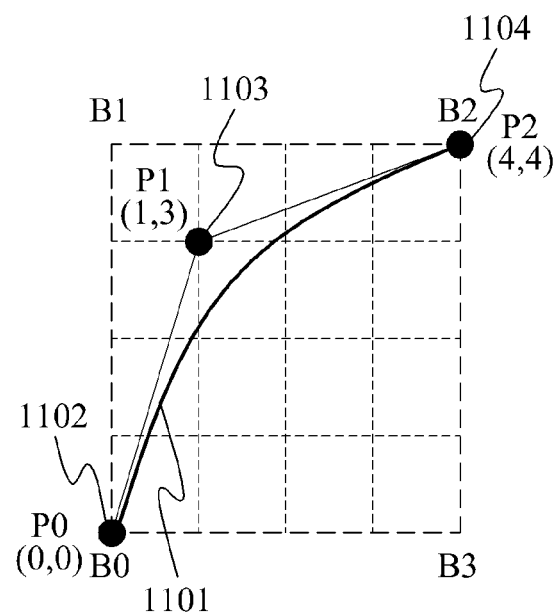

FIGS. 10 and 11 illustrate various types of Bezier curve.

The Bezier curve according to example embodiments may be in various types.

In the present disclosure above, Bezier curves that are convex upward or downward or have a local maximum or local minimum at an upper portion or lower portion have been described. However, the aspect of the example embodiments may be applied to Bezier curves which are convex leftward or rightward or have a local maximum or local minimum at a left portion or right portion.

That is, as shown in FIG. 10, the bounding box generation unit may determine a second control point 1003 such that a local maximum of a Bezier curve 1001 is disposed at a left portion. Also, the bounding box generation unit may generate the bounding box considering that the first control point 1002 is expressed by a global minimum. A third control point 1004 may be used for calculating a Y value with respect to an upper side of the bounding box.

In the same manner, the bounding box generation unit may determine a second control point 1008 such that a local maximum of a Bezier curve 1005 is disposed at a right portion. Also, the bounding box generation unit may generate the bounding box considering that a first control point 1006 is expressed by a global minimum. A third control point 1007 may be used for calculating a Y value with respect to an upper side of the bounding box.

FIG. 11 illustrates a Bezier curve 1101 of which a Y coordinate value of a second control point 1103 P1(1, 3) is present between a first control point 1102 P0 (0, 0) and a Y coordinate value of a third control point 1104 P2(4, 4).

In this case, the local maximum or the local minimum may not be calculated through the Bezier curve. Therefore, tile binning may be performed by generating one tight bounding box instead of a plurality of bounding boxes and tiles.

Figure 12:
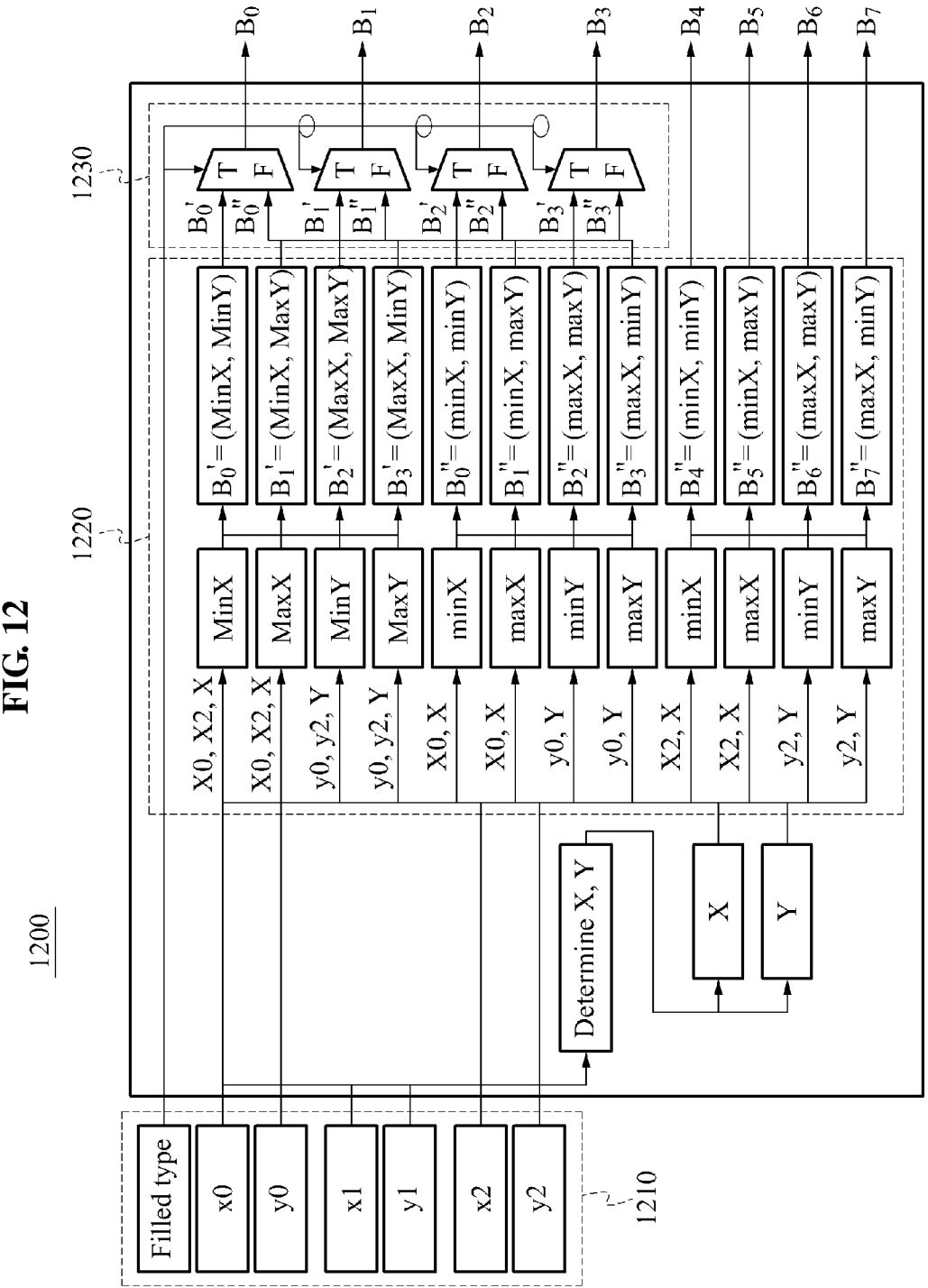
FIG. 12 illustrates a graphic processing apparatus that receives input of control points with respect to the Bezier curve and generates bounding boxes, according to example embodiments.

FIG. 12 illustrates a graphic processing apparatus 1200 that receives input of control points with respect to a Bezier curve and generates bounding boxes, according to example embodiments.

The graphic processing apparatus 1200 may be input with information 1210 related to a coordinate (x0, y0) of a first control point, a coordinate (x1, y1) of a second control point, and a coordinate (x2, y2) of a third control point.

The graphic processing apparatus 1200, using a logical structure 1220, may output a smallest x coordinate value, a largest x coordinate value, a smallest y coordinate value, and a largest y coordinate value among the coordinate (x0, y0) of the first control point, the coordinate (x1, y1) of the second control point, and the coordinate (x2, y2) of the third control point.

According to the example embodiment, the graphic processing apparatus 1200 may select output of data using a logical structure 1230 operated according to a filled type, i.e., stroked curve or filled curve.

In detail, when the filled type is a stroked curve, the logical structure 1230 may be input with T indicating 'true', and output information on a bounding box in which B'0 to B'3 are identified as B0 to B3. In addition, the graphic processing apparatus 1200 may output information on another bounding box identified as B4 to B7 irrespective of the filled type.

When the filled type is a filled curve, the logical structure 1230 may be input with F indicating 'false', and output only information on a bounding box in which B"0 to B"3 are identified as B0 to B3. In this case, B4 to B7 are ignored.

Figure 13:
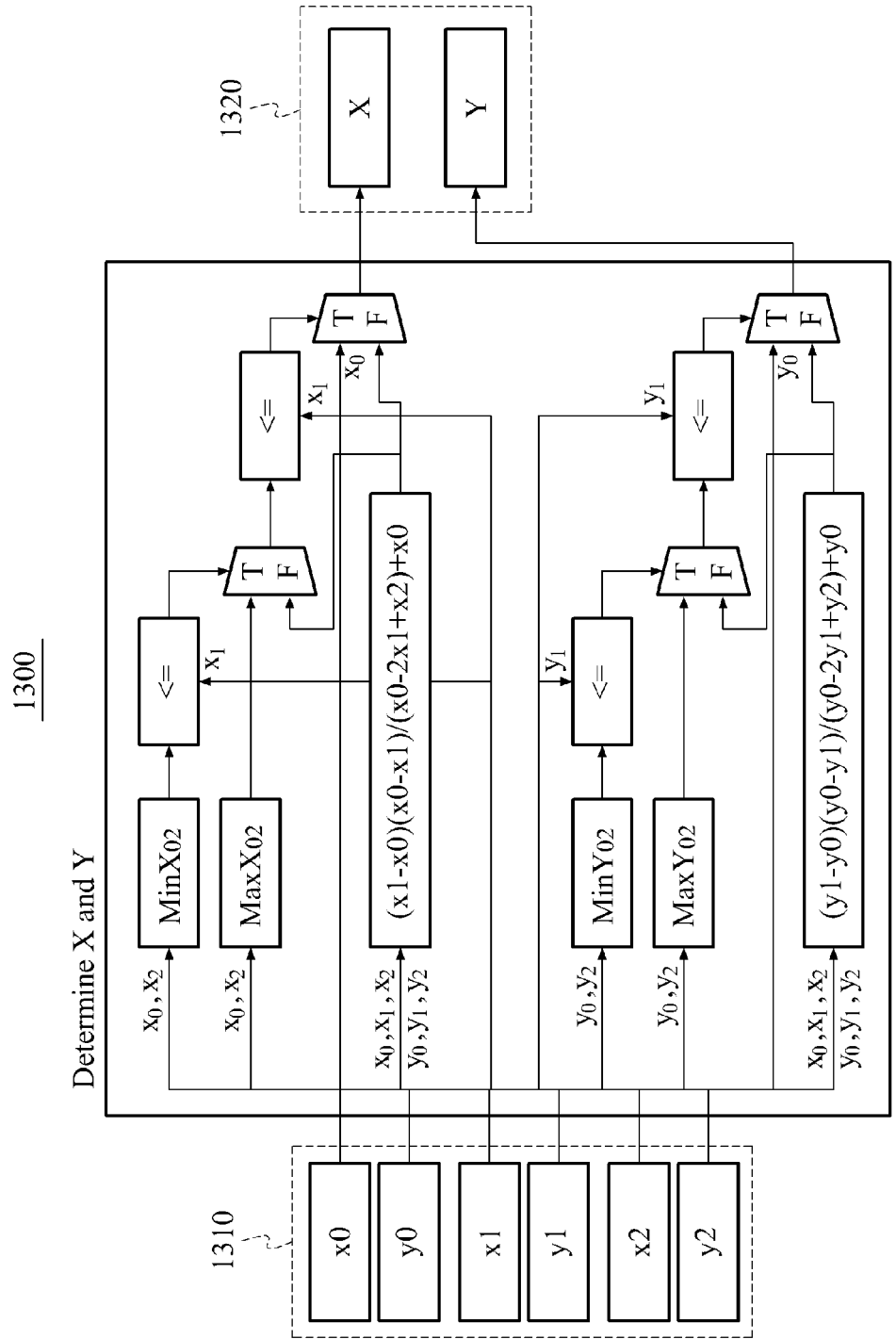
FIG. 13 illustrates an exemplary device to determine X and Y values in FIG. 12.

FIG. 13 illustrates a device 1300 determining the X value and the Y value in FIG. 12 in detail.

The device 1300 may receive input of information 1310 related to a coordinate (x0, y0) of a first control point, a coordinate (x1, y1) of a second control point, and a coordinate (x2, y2) of a third control point, and output the X and Y values 1320.

Referring to FIG. 13, $MinX_{02}$ and $MinY_{02}$ refer to devices that output a global minimum of input values among the information 1310 related to the coordinate (x0, y0) of the first control point, the coordinate (x1, y1) of the second control point, and the coordinate (x2, y2) of the third control point.

For example, when x0 and x2 are input to the $MinX_{02}$, the $MinX_{02}$ may output a global minimum between x0 and x2.

When y0 and y2 are input to $MinY_{02}$, the $MinY_{02}$ may output a global minimum between y0 and y2.

$MaxX_{02}$ and $MaxY_{02}$ refer to devices that output a global maximum of input values among the information 1310 related to the coordinate (x0, y0) of the first control point, the coordinate (x1, y1) of the second control point, and the coordinate (x2, y2) of the third control point.

A T/F logic refers to a device that outputs an input of a T terminal when a condition is true, and outputs an input of an F terminal when a condition is false.

A tight bounding box with respect to a quadratic Bezier curve is not limited to the foregoing device 1300 but may be partially or wholly implemented as software.

Figure 14:
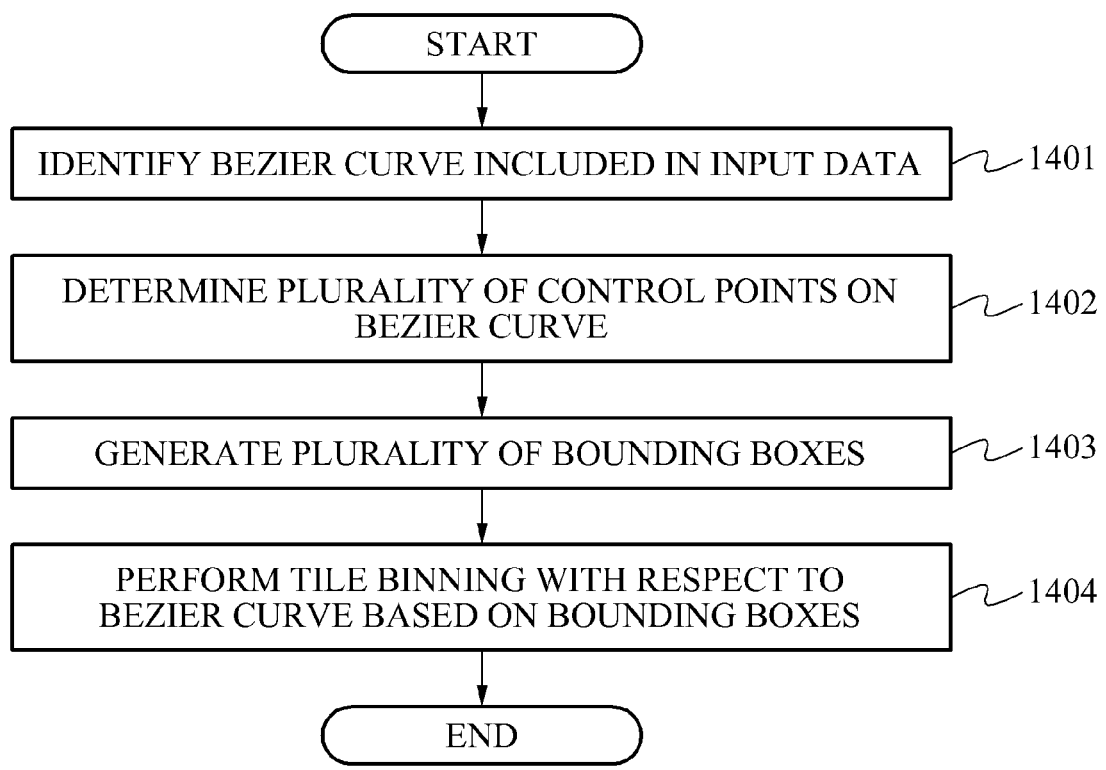
FIG. 14 illustrates an exemplary graphic processing method, according to example embodiments.

FIG. 14 illustrates a graphic processing method, according to example embodiments.

In operation 1401, the graphic processing method may identify a Bezier curve included in input data. That is, the graphic processing method may identify whether the Bezier curve is stroked type of filled type.

In operation 1402, the graphic processing method may determine a plurality of control points on the Bezier curve.

In operation 1403, the graphic processing method may generate a plurality of bounding boxes using the plurality of control points.

To generate the plurality of bounding boxes, the graphic processing method may determine a first control point, a second control point, and a third control point on the Bezier curve.

In addition, the graphic processing method may generate a first bounding box by setting the first control point and the second control point as vertices, and a second bounding box by setting the second control point and the third control point as vertices.

In operation 1404, the graphic processing method may perform tile binning with respect to the Bezier curve based on the plurality of bounding boxes.

The graphic processing method may perform tile binning with respect to the Bezier curve by determining whether at least a part of an area defined by the first bounding box and the second bounding box is included in a tile.

Using a graphic processing apparatus and method according to the example embodiments, bounding boxes may be generated using control points without having to calculate an equation related to a Bezier curve.

Therefore, structuring of a tile bin on a tile-based rendering pipeline may be efficiently performed. As a result, system resources with respect to the Bezier curve may be reduced.

Accordingly, accelerated rendering may be applied even in the field of 2D graphics including the Bezier curve with respect to which accelerated rendering is hard to perform.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the graphic processing apparatus, as discussed above, may include at least one processor to execute at least one of the above-described units and methods.

Example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A graphic processing apparatus for efficiently performing tile binning, comprising:
   at least one processor; and
   a memory having instructions stored thereon executed by the at least one processor to perform;
   identifying a Bezier curve;
   generating a plurality of bounding boxes corresponding to the identified Bezier curve; and
   performing the tile binning with respect to the Bezier curve based on the plurality of bounding boxes to reduce system resources,
   wherein the generating the plurality of bounding boxes comprises determining a control point of a plurality of control points as having a local maximum of the Bezier curve or a local minimum of the Bezier curve and generating the plurality of bounding boxes by setting the control point as a vertex of a bounding box of the plurality of bounding boxes, and
   wherein the local maximum or the local minimum is corresponding to original axes of the Bezier curve.

2. The graphic processing apparatus of claim 1, wherein the performing the tile binning comprises determining whether at least a part of an area defined by the plurality of bounding boxes is included in a tile and performing the tile binning with respect to the Bezier curve.

3. The graphic processing apparatus of claim 1, wherein the generating the plurality of bounding boxes further comprises determining the plurality of control points as being a first control point, a second control point, and a third control point on the Bezier curve.

4. The graphic processing apparatus of claim 3, wherein the generating the plurality of bounding boxes further comprises generating the plurality of bounding boxes by setting at least one of the first control point, the second control point, and the third control point as vertices.

5. The graphic processing apparatus of claim 3, wherein the generating the plurality of bounding boxes further comprises determining the second control point as having a local maximum of the Bezier curve, and determining the first control point or the third control point as having a global minimum of the Bezier curve.

6. The graphic processing apparatus of claim 3, wherein the generating the plurality of bounding boxes further comprises determining the second control point as having a local minimum of the Bezier curve, and determining the first control point or the third control point as having a global maximum of the Bezier curve.

7. The graphic processing apparatus of claim 3, wherein the generating the plurality of bounding boxes further comprises generating a first bounding box by setting the first control point and the second control point as vertices of the first bounding box, and generating a second bounding box by setting the second control point and the third control point as vertices of the second bounding box.

8. A graphic processing apparatus for efficiently performing tile binning, comprising:
   at least one processor, and
   a memory having instructions stored thereon executed by the at least one processor to perform:
   identifying a Bezier curve;
   confirming a type of the identified Bezier curve,
   generating at least one bounding box corresponding to the confirmed type of the Bezier curve; and
   performing the tile binning with respect to the Bezier curve based on the generated at least one bounding box to reduce system resources,
   wherein the generating the at least one bounding box comprises determining a control point of a plurality of control points as having a local maximum of the Bezier curve or a local minimum of the Bezier curve and generating the at least one bounding box by setting the control point as a vertex of at least one bounding box, and
   wherein the local maximum or the local minimum is corresponding to original axes of the Bezier curve.

9. The graphic processing apparatus of claim 8, wherein the performing the tile binning comprises determining whether at least a part of an area defined by the generated at least one bounding box is included in a tile and performing the tile binning with respect to the Bezier curve.

10. The graphic processing apparatus of claim 8, wherein the generating the at least one bounding box further comprises determining whether the Bezier curve has a stroked curve form or a filled curve form, and generating a plurality of bounding boxes corresponding to the Bezier curve when the Bezier curve has the stroked curve form.

11. The graphic processing apparatus of claim 10, wherein the generating the at least one bounding box further comprises generating a tight bounding box that is tight against the Bezier curve when the Bezier curve has the filled curve form.

12. A graphic processing method of a graphic processing apparatus for efficiently performing tile binning, the method comprising:
   identifying, using a processor, a Bezier curve;
   determining, using a processor, a plurality of control points on the identified Bezier curve;
   generating, using a processor, a plurality of bounding boxes using the determined plurality of control points; and
   performing, using a processor, the tile binning with respect to the identified Bezier curve based on the plurality of bounding boxes to reduce system resources,
   wherein the determining the plurality of control points on the identified Bezier curve comprises determining a control point of the plurality of control points as having a local maximum of the Bezier curve or a local minimum of the Bezier curve,
   wherein the generating the plurality of bounding boxes using the determined plurality of control points comprises generating the plurality of bounding boxes by setting the control point as a vertex of a bounding box of the plurality of bounding boxes, and
   wherein the local maximum or the local minimum is corresponding to original axes of the Bezier curve.

13. The graphic processing method of claim 12, wherein the generating the plurality of bounding boxes comprises:
   determining a first control point, a second control point, and a third control point on the identified Bezier curve;

generating a first bounding box using the first control point and the second control point as vertices of the first bounding box; and generating a second bounding box using the second control point and the third control point as vertices of the second bounding box.

14. The graphic processing method of claim 13, wherein the performing comprises performing the tile binning with respect to the identified Bezier curve by determining whether at least a part of an area defined by the first bounding box and the second bounding box is included in a tile.

15. A graphic processing method for efficiently performing tile binning, comprising:

identifying, using a processor, a Bezier curve; and performing, using a processor, the tile binning by generating and using at least one bounding box that is tight with respect to the identified Bezier curve to reduce system resources, wherein the generating of the at least one bounding box comprises determining a control point of a plurality of control points as having a local maximum of the Bezier curve or a local minimum of the Bezier curve and generating the at least one bounding box by setting the control point as a vertex of the at least one bounding box, and wherein the local maximum or the local minimum is corresponding to original axes of the Bezier curve.

16. The graphic processing method of claim 15, wherein the at least one bounding box is generated using control points passing through the Bezier curve.

17. The graphic processing method of claim 15, wherein the generating of the at least one bounding box that is tight with respect to the identified Bezier curve is based on a type of the Bezier curve.

18. The graphic processing method of claim 17, wherein one bounding box is generated when the type of the Bezier curve is a filled curve form.

19. The graphic processing method of claim 17, wherein a plurality of bounding boxes is generated when the type of the Bezier curve is a stroked curve form.

* * * * *